E. G. GILSON.
MOLDED CONDUCTOR.
APPLICATION FILED MAR. 7, 1910.
1,008,535.
Patented Nov. 14, 1911.
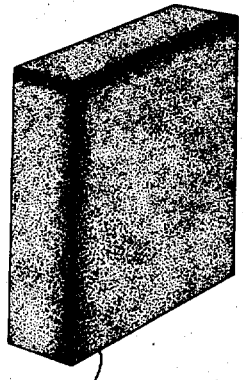
Contains Graphite and Iron
WITNESSES:
J. Earl Ryan
J. Ellis Glen.
INVENTOR:
EMERY G. GILSON,
BY Albert G. Davis
HIS ATTORNEY.

UNITED STATES PATENT OFFICE.

EMERY G. GILSON, OF SCHENECTADY, NEW YORK, ASSIGNOR TO GENERAL ELECTRIC COMPANY, A CORPORATION OF NEW YORK.

MOLDED CONDUCTOR.

1,008,535.  Specification of Letters Patent.  Patented Nov. 14, 1911.

Application filed March 7, 1910. Serial No. 547,739.

*To all whom it may concern:*

Be it known that I, EMERY G. GILSON, a citizen of the United States, residing at Schenectady, in the county of Schenectady, State of New York, have invented certain new and useful Improvements in Molded Conductors, of which the following is a specification.

My invention relates to the production of molded articles employed as current-carrying conductors, particularly current collectors for dynamo-electric machines.

Modern electrical practice requires for certain kinds of service a collector or brush having a high conductivity and a low contact resistance. When the brush is to be used with a commutating machine it is desirable that the transverse resistance of the brush shall be relatively high, to reduce sparking by cutting down the current in the short-circuited coil, as is well understood. These apparently antagonistic properties are present in a brush made according to my invention. The brushes consist of graphite associated with a metal of the iron group. The metal constituent is preferably introduced by mixing it in the form of an oxid with finely divided graphite, the mixture then being fired at a relatively high temperature. The product is finally molded by the application of pressure, no binder being required; the material itself having the property of molding under pressure.

A molded article made in accordance with my invention is shown in the accompanying drawing.

In carrying out my process any pure form of graphite may be employed; but I find that the best results are obtained when using graphite which has been subjected to the following treatment: 100 parts of finely divided graphite, preferably Ceylon graphite, are mixed with about 50 parts of potassium carbonate, also in a finely divided state. The mixture is placed in a graphite crucible and fired in a suitable furnace to a temperature of about 900° C. A gas fired furnace, or an electrical resistance furnace can be used. The firing is continued for about four hours when working with a mass of about 500 grams. After cooling, the mixture is washed with water until the graphite has been entirely freed from potassium carbonate, as can be easily determined by testing the wash water for the presence of potassium carbonate. The treatment with potassium carbonate apparently removes impurities from the graphite and also changes it in some way so as to make it finer and more easily compacted. 100 parts of graphite, preferably that prepared as above described, are now mixed with 50 parts of iron oxid in powdered form. I prefer to use the red oxid, $Fe_2O_3$, but other oxids, such as the black oxid, $Fe_3O_4$, can likewise be used. In the place of iron oxid, nickel oxid, or, in general, a metal oxid of the iron group can be used, but as iron is cheap and gives good results it is preferably employed. The above proportions of graphite and oxid are given as a matter of illustration and need not be strictly adhered to, the particular mixture depending somewhat upon the properties desired in the completed brush. A higher percentage of iron decreases the conductivity, but increases the strength of the brush somewhat. This mixture is fired in a graphite crucible to a temperature of about 900° C. in a suitable furnace. The firing treatment reduces the iron oxid to metallic iron, which in turn combines with the graphite to form a carbid, or a compound analogous thereto. I do not wish, however, to be limited by this view as to what takes place during the firing treatment, as the iron and the graphite are so thoroughly mixed that it is difficult to say in what form the iron is present after the mixture has been fired. After firing the mixture is compacted into predetermined form by the application of a pressure of about 20 tons to the square inch, or even more. The finished brushes are strong, considerably harder than graphite, and more conductive than a carbon brush.

The electrical resistance of the molded article is greater in the direction in which the pressure was applied when molding the same than in a direction at right angles thereto. On the average the ratio of resistance is seven or ten to one. The difference in resistance is due to a laminated structure, produced when pressing. This property is utilized by pressing the brush in such a manner that the highest resistance in the brush when applied to a commutating machine is across the short-circuited coil, and will thus reduce the current.

What I claim as new and desire to secure by Letters Patent of the United States, is—

1. The process, which consists in mixing graphite and an oxid of a metal of the iron group, both in powdered form, firing said mixture to a temperature of about 900° C., and then molding the product by the application of pressure.

2. The process, which consists in mixing graphite and oxid of a metal of the iron group, both being finely divided, firing said mixture, and pressing into predetermined form.

3. The process, which consists in mixing finely divided graphite and finely divided iron oxid, firing said mixture to a temperature of about 900° C., and finally molding said mixture by the application of pressure.

4. As an article of manufacture, a molded mass of carbon containing iron combined with carbon uniformly distributed therethrough.

5. A molded electrical conductor, consisting of graphite associated with an iron-carbon compound.

6. The process, which consists in firing graphite in the presence of a potassium compound, removing said potassium compound, mixing with the graphite ferrous material, firing said mixture, and finally molding the product by the application of pressure.

7. The process, which consists in firing Ceylon graphite in the presence of a potassium compound, subsequently removing the potassium compound, mixing with the graphite and oxid of iron, firing said mixture at about 900° C., and finally pressing the product into predetermined form.

8. As an article of manufacture, a molded mass consisting substantially of iron and graphite, the latter element preponderating in amount.

In witness whereof, I have hereunto set my hand this 4th day of March, 1910.

EMERY G. GILSON.

Witnesses:
BENJAMIN B. HULL,
HELEN ORFORD.

Copies of this patent may be obtained for five cents each, by addressing the "Commissioner of Patents, Washington, D. C."